(12) United States Patent
Chiu et al.

(10) Patent No.: US 12,457,700 B2
(45) Date of Patent: Oct. 28, 2025

(54) REMOVABLE OCP MODULE WITH PCIe SLOTS

(71) Applicant: HEWLETT PACKARD ENTERPRISE DEVELOPMENT LP, Spring, TX (US)

(72) Inventors: Chui Ching Chiu, Taoyuan (TW); Chih-Wei Chiang, Taoyuan (TW); Hsueh-Yu Chao, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 129 days.

(21) Appl. No.: 18/442,583

(22) Filed: Feb. 15, 2024

(65) Prior Publication Data

US 2025/0267815 A1     Aug. 21, 2025

(51) Int. Cl.
| | |
|---|---|
| *G06F 1/16* | (2006.01) |
| *G06F 1/18* | (2006.01) |
| *H05K 1/18* | (2006.01) |
| *H05K 5/00* | (2025.01) |
| *H05K 7/00* | (2006.01) |
| *H05K 7/10* | (2006.01) |

(52) U.S. Cl.
CPC .......... *H05K 7/1092* (2013.01); *G06F 1/185* (2013.01); *H05K 1/18* (2013.01); *H05K 7/103* (2013.01); *H05K 2201/09027* (2013.01); *H05K 2201/10189* (2013.01)

(58) Field of Classification Search
CPC ........ H05K 7/1092; H05K 7/103; H05K 7/10; H05K 7/1023; H05K 7/1015; H05K 7/1053; H05K 7/1061; H05K 7/1076; H05K 2201/09027; H05K 2201/10189; H05K 1/18; H05K 1/181; G06F 1/185; G06F 1/186; G06F 1/183
See application file for complete search history.

(56) References Cited

U.S. PATENT DOCUMENTS

| | | | | |
|---|---|---|---|---|
| 9,713,279 | B2 * | 7/2017 | Tseng .................... | H05K 7/1487 |
| 11,212,933 | B2 * | 12/2021 | Tsorng .................... | G06F 1/183 |
| 2017/0161222 | A1 * | 6/2017 | Dubal .................... | H04L 67/10 |

(Continued)

OTHER PUBLICATIONS

Kumar, R., "OCP NIC 3.0 Form Factors the Quick Guide," May 2, 2022, 12 pages.

(Continued)

*Primary Examiner* — Anthony M Haughton
(74) *Attorney, Agent, or Firm* — Jones Robb PLLC

(57) ABSTRACT

A removable module, a system and a method. The removable module comprising a PCB having an OCP NIC form factor, an OCP edge connector comprising a plurality of pins on an edge of the PCB, wherein the OCP edge connector is configured to mate with an OCP board connector of a primary system board of the computing system in an installed state of the removable module in the computing system, a NIC chip mounted to the PCB and communicably connected to the OCP edge connector, at least one communication port mounted to the PCB and communicably connected to the NIC chip and a first PCIe slot mounted on the PCB and communicably connected to the OCP edge connector, wherein the NIC chip and the first PCIe slot are configured to be communicably connected to the primary system board via the OCP edge connector.

20 Claims, 6 Drawing Sheets

(56) References Cited

U.S. PATENT DOCUMENTS

| | | | |
|---|---|---|---|
| 2017/0262396 A1* | 9/2017 | Mundt | G06F 13/409 |
| 2019/0012288 A1* | 1/2019 | Zhao | G06F 13/4282 |
| 2021/0120695 A1* | 4/2021 | Tsorng | H05K 1/18 |
| 2022/0201909 A1* | 6/2022 | Tsorng | H05K 7/1415 |
| 2022/0346243 A1* | 10/2022 | Zhang | H05K 5/0069 |

OTHER PUBLICATIONS

OCP Server Workgroup, OCP NIC Subgroup, OCP NIC 3.0 Design Specification, 237 pages.

* cited by examiner

REMOVABLE OCP MODULE WITH PCIe SLOTS

INTRODUCTION

A computing system circuit board, such as a motherboard, includes multiple components and connectors. Examples of components commonly included on such a system board include CPU sockets to receive a processor, memory sockets to receive memory devices, control circuitry, and power regulation circuitry. Examples of connectors commonly included on a system board include PCIe expansion slots. The PCIe expansion slots are provided to allow for additional components, often called expansion cards, to be added to the computing system. Examples of common types of expansion cards include video cards or graphic processing units (GPUs), storage controllers, hardware accelerators, and so on.

In systems that utilize an Open Compute Project (OCP) form factor, some components that were otherwise embedded into a motherboard may now be provided as part of removable OCP modules. For example, management and security circuitry such as a baseboard management controller (BMC) which would previously have been part of the motherboard may instead be provided in an OCP Datacenter Secure Control Module (DC-SCM). Similarly, network interface circuitry which may have previously been permanently mounted to the motherboard may instead be provided in a removable OCP Network Interface Card (NIC) module. The primary system board (which is referred to as a Host Processor Module (HPM) in OCP terminology) comprises electrical connectors having specific form factors defined in the OCP standards—for example, a 4C+ connector, a 4C connector, etc.—arranged to removable receive the OCP modules. In some systems, the OCP connectors are positioned at the rear of the system (e.g., straddling the rear edge of the primary system board) to allow the removable OCP modules to be accessible for insertion or removal at the rear panel of the system without requiring the opening of the chassis or the use of any specialized tools. Because the OCP modules are removable and have standardized form factors, it can be easier to customize or upgrade the computing system, for example by replacing one OCP module for another. In contrast, in a non-OCP system, it might not be possible to customize or upgrade some components provided as part of the motherboard (e.g., the BMC) without replacing the entire motherboard. Other aspects of a non-OCP system, such as the network interface, may be upgradable (e.g., by adding a NIC card), but doing so may require the use of an expansion slot (if one is available), which precludes the use of that expansion slot to receive other expansion cards, and the old unused interface remains on the motherboard taking up valuable and limited space.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

Figure 1:
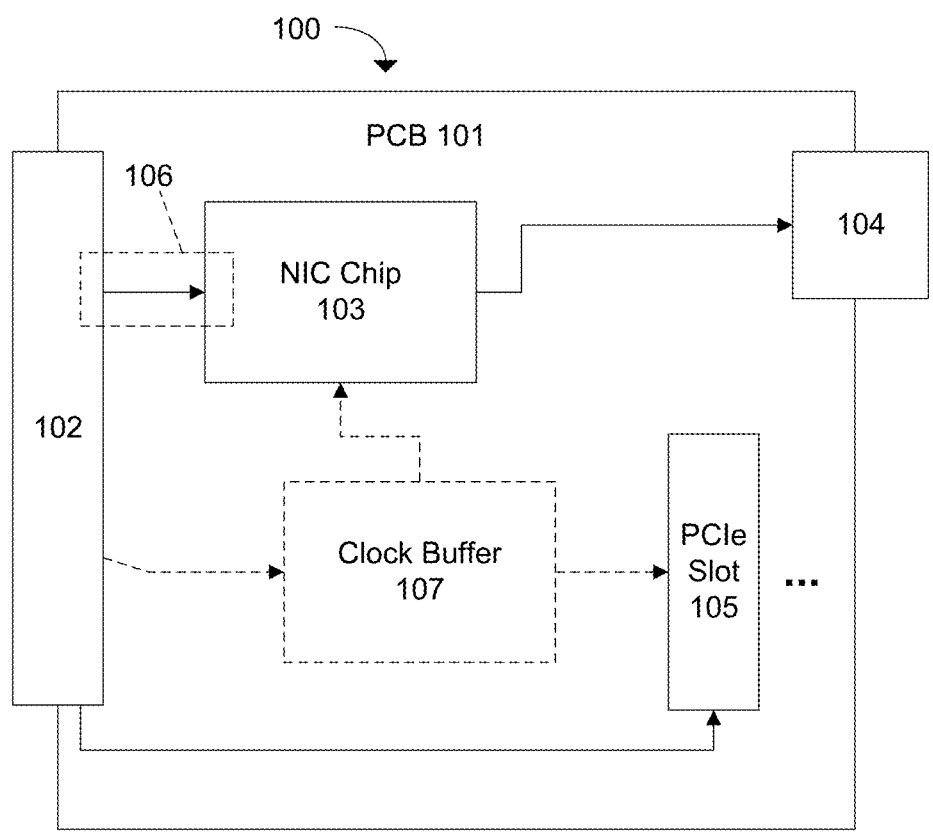
FIG. 1 is a block diagram illustrating an example of a removable OCP module with PCIe slots.

The drawings are included to provide a further understanding of the present disclosure and are incorporated in and constitute a part of this specification. The drawings illustrate one or more examples of the present teachings and together with the description explain certain principles and operations. In some occasions, details that are not necessary for an understanding of an instance of this disclosure or that render other details difficult to perceive may have been omitted.

DETAILED DESCRIPTION

Although the use of the OCP form factor can have numerous benefits, some of which are discussed above, in some instances, OCP HPMs may also have some limitations as compared to other system boards. In particular, in some instances the OCP HPM may have challenges with respect to usability of PCIe expansion slots. Many OCP HPMs are designed to receive the OCP modules at a rear edge of the HPM, with the OCP modules occupying the rear portion of the chassis. However, this region near the rear of the chassis in which the OCP modules are to be located happens to also be the region where PCIe slots would normally be located on various other system boards, and consequently the HPMs may need to omit some PCIe expansion slots and/or reposition PCIe expansion slots farther forward to accommodate the OCP modules. As a result, PCIe expansion cards (e.g., GPUs) that were designed to connect to the PCIe slots in existing system boards may not be able to reach the PCIe slots in their farther-forward locations on the HPM. More specifically, PCIe expansion cards are generally configured to have a rear side thereof attached to a rear panel of the chassis of the computing system to provide support thereto, and the PCIe slots on existing motherboards are usually positioned a predetermined distance from the rear panel such that, when the PCIe expansion card is attached to the rear panel, an electrical connector of the PCIe card is aligned with and connectable to the PCIe slot of the motherboard. However, because the PCIe slots are located farther forward in the HBM, when the PCI expansion card is attached to the rear panel, the electrical connector of the PCIe card is no longer aligned with the PCIe slot.

One way to address this issue would be to produce a new longer PCIe expansion card form factor with the electrical connector located farther forward so as to accommodate the HPM's new farther-forward PCIe slot locations, but designing and/or manufacturing an entirely new PCIe expansion card form factor may be costly and may not be economically feasible. In addition, this may preclude backwards compatibility of the OCP system with existing PCIe expansion cards.

Another way to address this issue is to use riser cards or cables as intermediaries to connect the PCIe expansion cards to the PCIe slots. However, riser cards and cables can also be costly to design and to manufacture, and while these costs may be justified for some higher-cost platforms, the costs of the riser cards and cables may not be justifiable for some lower-cost platforms. Furthermore, some platforms, such as a Vertical Form Factor platform such as tower type servers, may have space constraints that may rule out the use of certain riser cards. In addition, riser cards and cables may also come with some tradeoffs in some circumstances, such as increasing impedance to airflow, complicating assembly or maintenance of the computing system, and providing additional points of potential failure.

Accordingly, in some computing systems that utilize OCP HPMs, particularly systems having a vertical form factor, the PCIe slots of the HPM may not be accessible for use by existing PCIe expansion cards.

To address the above-mentioned challenges, the disclosure provides OCP NIC/PCIe modules that have the physical form factor and NIC functionality of an OCP NIC module, while also including one or more PCIe slots. These OCP NIC/PCIe modules, although not explicitly defined by the OCP specifications, are referred to herein as "OCP" modules because they follow an OCP NIC physical form factor specification and can be plugged into existing OCP board connectors of an OCP HPM and can provide NIC functionality similar to existing OCP NIC modules. The NIC circuitry and the PCIe slot(s) may both be communicably connected to the HPM by the same OCP NIC edge connector of the NIC/PCIe module and by the same OCP board connector of the HPM. The PCIe slots are positioned on the PCB of the NIC/PCIe module so as to be accessible to receive the electrical connectors of PCIe expansion cards when the OCP NIC/PCIe module is installed in the system. In other words, when the OCP NIC/PCIe module is installed in the system, the PCIe expansion slots thereof are located at approximately the same predetermined distance from the rear panel as would be the PCIe expansion slots in non-OCP systems, thus allowing existing PCIe expansion cards attached to a rear panel of the system to directly connect to the PCIe slots of the OCP NIC/PCIe module. The OCP NIC/PCIe modules disclosed herein thus solve the issues of OCP primary board (HPM) having inaccessible PCIe slots, and also increases the overall number of PCIe slots in the system.

The OCP NIC/PCIe module comprises an edge connector having the form factor of an OCP edge connector, and some of the pins of this edge connector may be used to form PCIe lanes for the PCIe slot(s). In some examples, to allow the PCIe slots and the NIC circuitry to all have sufficient PCIe lanes for communication with the HPM, some pins of the edge connector may be repurposed to provide one or more additional PCIe communication lanes. For example, in some implementations some clock differential pin pairs (differential pin pairs which are defined in the OCP specification to receive clock signals) may instead be used in the OCP NIC/PCIe module as PCIe transmission and reception signal pathways forming a PCIe lane. In some cases, the additional PCIe lane may be provided to a NIC controller.

The remaining clock pin pairs which have not been converted into PCIe lanes may continue to be used for providing clock signals for use by the NIC circuitry and the PCIe slot(s). However, in some cases, the number of clock pin pairs that are available to provide clock signals is insufficient to provide the needed number of clock signals, and in such examples a clock buffer may be included in the NIC/PCIe module to supply additional clock signals. For example, in some instances, the NIC/PCIe module includes two PCIe slots, in which case at least three clock signals may be needed: one for a NIC controller and one each for the two PCIe slots. In some of these instances, the OCP edge connector, such as a 4C+ edge connector, does not have sufficient pins, as defined in the specification, to support all of the signaling needs of the components. For example, the 4C+ OCP edge connector may comprise four clock pin pairs and two of these may need to be repurposed to provide an additional PCIe lane, leaving only two clock pin pairs to provide two clock signals, instead of the needed three clock signals. To address this issue, in some examples the OCP NIC/PCIe module includes a clock buffer configured to allow for the expansion of one clock signal received via one differential pin pair of the OCP connector into multiple clock signal outputs. In this configuration, two pin pairs of the OCP connector may provide the data signal paths for the PCIe interface, another pin pair may provide a clock signal input to the clock buffer, and the clock buffer may convert the clock signal input into additional clock signals for the NIC chip and the two PCIe slots. In other examples, additional PCIe slots may be added to the above configuration, with the clock buffer providing additional clock signals for use by the additional PCIe slots.

These and other examples will be described in greater detail below in relation to FIGS. 1-5.

Now referring to FIG. 1, a removable module 100 for a computing system, is presented. The removable module 100 is one example of the OCP NIC/PCIe modules described above. Removable module 100 includes a printed circuit board (PCB) 101, an OCP edge connector 102, a NIC chip 103, at least one communication port 104, and one or more PCIe slots 105. These and other aspects of the removable module 100 will be described in turn below.

The PCB 101 has a form factor which complies with the PCB form factor defined in one of the open compute project (OCP) network interface controller (NIC) form factors. As used herein, a "PCB" is a board made from non-conductive material with conductive pathways traversing the board and providing connectivity between components, which are mounted to the PCB. An "OCP NIC form factor," as used in this disclosure, is a form factor for a Network Interface Controller configured to mate with and connect to an OCP primary board (HPM), as defined by one of the OCP specifications. For example, OCP NIC form factors include Large Form Factor (LFF), Small Form Factor (SFF), and Tall Small Form Factor (TSFF), as defined by the OCP NIC 3.0 specification. In examples disclosed herein, at least the physical form factor of the PCB 101 complies with one of the OCP NIC form factors. For example, the size and shape of the PCB 101, which may include keying or attachment features included therein, may comply with those specified in one of the OCP NIC form factors.

Continuing to refer to FIG. 1, in an instance, removable module 100 includes an OCP edge connector 102. As used herein, an "OCP edge connector" is an OCP form factor electrical connector, i.e., a connector which complies with one of the connector physical form factors for edge connectors defined by OCP and which is thus capable of connecting to one of the OCP board connectors defined by OCP. In an example, without limitations, OCP edge connector 102 may include a NIC 3.0 standard connector, such as a 4C+ or 4C connector. The OCP edge connector 102 includes a plurality of pins on an edge of PCB 101, where OCP edge connector 102 is configured to mate with an OCP board connector. An example of an OCP board connector is described in detail further below in reference to FIG. 4. In some examples, OCP edge connector 102 may have the form factor of an OCP 4C+ edge connector, which has 168 contact pins and various keying features as defined by OCP. In further examples, OCP edge connector 102 may have the form factor of an OCP 4C edge connector, which has 140 contact pins and various keying features as defined by OCP. In other examples, OCP edge connector 102 may have the form factor an OCP 2C connector or other OCP connector. In still other examples, OCP edge connector 102 may comprise multiple edge connector portions which connect to separate OCP board connectors, with one connector portion having the form of an OCP 4C+ connector and the other connector portion having the form factor of an OCP 4C connector.

For example, in some implementations, the PCB 101 may comply with a SFF or TSFF form factor and the connector 102 may have the 4C+ form factor. These implementations of the removable module 100 may be referred to as an SFF NIC/PCIe or a TSFF NIC/PCIe. As another example, in some implementations, and continuing to refer to FIG. 1, the PCB 101 may comply with the LFF form factor, in which case the OCP edge connector 102 comprises a 4C+ connector portion and a 4C connector portion. These implementations of the removable module 100 may be referred to herein as a LFF OCP NIC/PCIe.

In addition to complying with the physical form factor of an OCP connector, in some examples the OCP edge connector 102 complies with the electrical specifications defined by OCP for OCP edge connectors, except that some of the pins thereof may be repurposed, as described below. For example, of the 168 pins in the OCP 4C+ edge connector, OCP defines eight (8) of these pins (four (4) differential pin pairs), for receiving clock signals, and in some examples disclosed herein in which the edge connectors 102 complies with the 4C+ form factor, four of the aforementioned clock signal pins (i.e., two of the differential pin pairs) are repurposed to form an additional PCIe lane.

In addition to the physical form factor of the PCB, OCP also defines form factors for other aspects of an OCP NIC module, such as a front face plate assembly, a top-level assembly, and an I/O interface layout. In some examples, the removable module 100 also complies with one, some, or all of these other physical form factor specifications (except where these may conflict with the PCIe slots 105). In other examples, the removable module 100 does not comply with the front face plate assembly, a top-level assembly, and/or I/O interface layout form factor definitions.

Continuing to refer to FIG. 1, removable module 100 includes a NIC chip 103. A "NIC chip", as used herein, is a hardware component embedded within a NIC configured to manage transmission and reception of data. In an example, NIC chip 103 may include commercially available chipsets such as the Broadcom BCM57414, made by Broadcom INC, located in San Jose CA, USA. In some instances, NIC chip 103 is mounted to PCB 101 and communicably connected to OCP edge connector 102. As used throughout this disclosure, "communicably connected," also referred herein as "communicably coupling," is a connection, attachment or linkage between two or more components which allow for reception and/or transmittance of data, or information, between those components. In an example, two or more components may be communicably connected through wired and/or wireless, digital or analog, communication, either directly or by way of one or more intervening devices or components.

Still referring to FIG. 1, removable module 100 includes at least one communication port 104. As used in this disclosure, a "communication port" is an interface on a computer or network device used for establishing connections and facilitating communication between devices. In some examples, communication port 104 may include ethernet ports, fiber channel ports, InfiniBand ports, optical transceiver receptacles (e.g., receptacles to receive QSFP or OSFP connectors), and the like. In instances, at least one communication port 104 is mounted to PCB 101 and communicably connected to OCP edge connector 102 and to NIC chip 103. During operation, NIC chip 103 manages transmission and reception of data between the communication port 104 and the HPM to which removable module 100 is connected.

Continuing to refer to FIG. 1, removable module 100 includes at least one Peripheral Component Interconnect Express (PCIe) slot 105. FIG. 1 shows one such PCIe slot 105 for ease of illustration, but in some instances, removable module 100 may include two or more PCIe slots 105. A "PCIe slot," as used herein, is an electrical connector configured to be mounted to a PCB and comprising a receptacle having an opening configured to receive an edge connector of a PCIe device and further comprising electrical pins disposed in the opening to contact corresponding contact pads (pins) on the edge connector inserted into the opening. The receptacle that forms the PCIe slot may have a shape, size, keying features, and pin layout as defined by PCIe specifications. The PCIe slot 105 is physically mounted to the PCB 101 and electrically connected to circuitry in the PCB 101. In some examples, the PCIe slot 105 is surface mounted to the PCB 101 and is configured to receive an edge connector oriented perpendicular to the PCB 101. In some examples, the PCIe slot 105 is mounted to the PCB 101 at a location which will allow the PCIe slot 105 to be a predetermined distance from a rear panel of a computing system when the removable module 100 is installed in the system (i.e., when the connector 102 is mated with an OCP board connector of an HPM of the system), wherein the predetermined distance is such that it allows the PCIe slot 105 to be aligned with the PCIe edge connector of a PCIe card mounted to the rear panel. In some examples, without limitation, PCIe slot 105 may be used for connecting PCIe cards comprising external devices such as Graphic cards (GPUs), storage controllers, and the like.

In instances, NIC chip 103 and first PCIe slot 105 are configured to be communicably connected to the primary system board via OCP edge connector 102 and the OCP board connector in the installed state of removable module 100. More specifically, OCP edge connectors as defined by OCP, such as the 4C+ and 4C connectors, comprise a number of pins which are defined for PCIe transmission or reception signals (referred to herein as PCIe pins). In other NIC modules, some or all of these PCIe pins would form part of a PCIe interface for the NIC circuitry to allow for communicating data with the HPM. However, in examples disclosed herein, the PCIe slot(s) 105 may utilize some or all of these PCIe pins in the edge connector 102 to form a PCIe interface for the PCIe slot(s) 105, allowing the PCIe slot(s) 105 to communicate with the HPM via the connector 102. In some examples, some pins of the connector 102 which would be defined for some other purpose in a standard OCP connector are repurposed in the connector 102 to instead form a PCIe interface 106 for the NIC chip 103. In other words, in some examples, the as-defined PCIe pins of the connector 102 would be used to form the PCIe interface(s) for the PCIe slot(s) 105 whereas repurposed pins of the connector 102 would be used to form the PCIe interface for the NIC chip 103. For example, in some implementations, a first differential pin pair originally defined by OCP for a clock signal may be repurposed into a PCIe transmission differential pair and a second differential pin pair originally defined by OCP for another clock signal may be repurposed into a PCIe reception differential pair. In other examples, the PCIe slot(s) 105 and the NIC chip 103 may both use the as-defined PCIe pins to form their respective PCIe interfaces, without needing to repurpose any of the pins (at the cost of potentially having smaller interfaces for the PCIe slots). In all of these examples, however, the PCIe slot(s) 105 and the NIC chip 103 are both communicating with the HPM via PCIe interfaces which are formed from pins of the same OCP edge connector 102 and which mate with the same OCP board connector. As used herein, a PCIe interface refers to the circuitry which connects two PCIe devices for PCIe communication, with each PCIe interface comprising one or more PCIe lanes. Each PCIe lane comprises two transmission signal paths (forming a differential signaling pair) and two reception signal paths (forming a differential signaling pair), with each signal path comprising conductors (wires, PCB traces, etc.), connector pin(s), or other circuitry. An example of an OCP board connector is described in more detail in reference to FIGS. 4 and 5.

Still referring to FIG. 1, in some instances, removable module 100 may further include a clock buffer 107 (clock buffer 107 is not necessarily included in all examples of removable module 100, and thus is shown in dashed lines in FIG. 1). A "clock buffer," as used herein, is an electronic circuit configured to receive a clock signal input and generate multiple clock signal outputs based on the clock signal input. Generally, the clock buffer 107 may be included in implementations in which the number of clock signals which are received from the HPM via the connector 102 are lower than the needed number of clock signals. For example, the OCP 4C+ or 4C form factor defines four differential pin pairs for receiving clock signals, but in some implementations of the removable module two of these differential pin pairs in the edge connector 102 are repurposed to provide PCIe interface 106 as described above, which may leave just two differential pin pairs for receiving clock signals. Furthermore, in some of these implementations, more than two clock signals may be needed—for example, if two PCIe slots 105 are present, then three clock signals will be needed (one for the NIC chip and one for each of the two PCIe slots 105). In still other implementations, even more clock signals may be needed (e.g., if more than two PCIe slots 105 are present). In such implementations, the clock buffer 107 may receive a clock signal input from one of the remaining clock differential pin pairs which has not been repurposed and may generate from that clock signal input multiple clock signal outputs.

In some examples, without limitation, clock buffer 107 may be a 1-4 clock buffer, where clock buffer 107 receives one clock signal input and replicates it into four clock signal outputs with identical frequency. In other examples, clock buffer 107 may be a 1-8 clock buffer, where clock buffer 107 receives one clock signal input and replicates it into eight clock signal outputs with identical frequency. In some instances, NIC chip 103 and/or PCIe slot(s) 105 may be communicably connected to clock buffer 107. Specifically, the clock buffer 107 may be mounted to PCB 101 and configured to receive a clock signal input from OCP edge connector 102 and output a clock signal outputs to NIC chip 103 and/or to one or more PCIe slots 105. In a nonlimiting example, removable module 100 may include two PCIe slots 105 and a 1-4 clock buffer 107, where clock buffer 107 receives a clock signal input and outputs replicated clock signals: a first clock signal to NIC chip 103, a second clock signal to a first PCIe slot 105, and a third clock signal to a second PCIe slot 105.

In some instances, continuing to refer to FIG. 1, clock buffer 107 may be communicably connected to a third differential pin pair from the plurality of pins to receive the clock signal input. For example, the third differential pin pair may be a pin pair which is originally defined by OCP for reception of a clock signal. The plurality of pins and differential pin pairs are described in more detail in reference to FIG. 2 further below.

In instances, still referring to FIG. 1, first PCIe slot 105 may be communicably connected to clock buffer 107 to receive a second clock signal of the output clock signals. In some instances, removable module 100 may further include a second PCIe slot mounted to PCB 101 and communicably connected to clock buffer 107 to receive a third clock signal of the clock signal output.

In some instances, OCP edge connector 102 may be configured to connect to two OCP board connectors of the primary system board, i.e., a first OCP board connector and a second OCP board connector of the primary system board. In an example, OCP edge connector 102 may include a first connector portion having the form factor of an OCP 4C+ connector and a second connector portion having the form factor of an OCP 4C connector configured to mate with two OCP board connectors of the primary system board.

Figure 2:
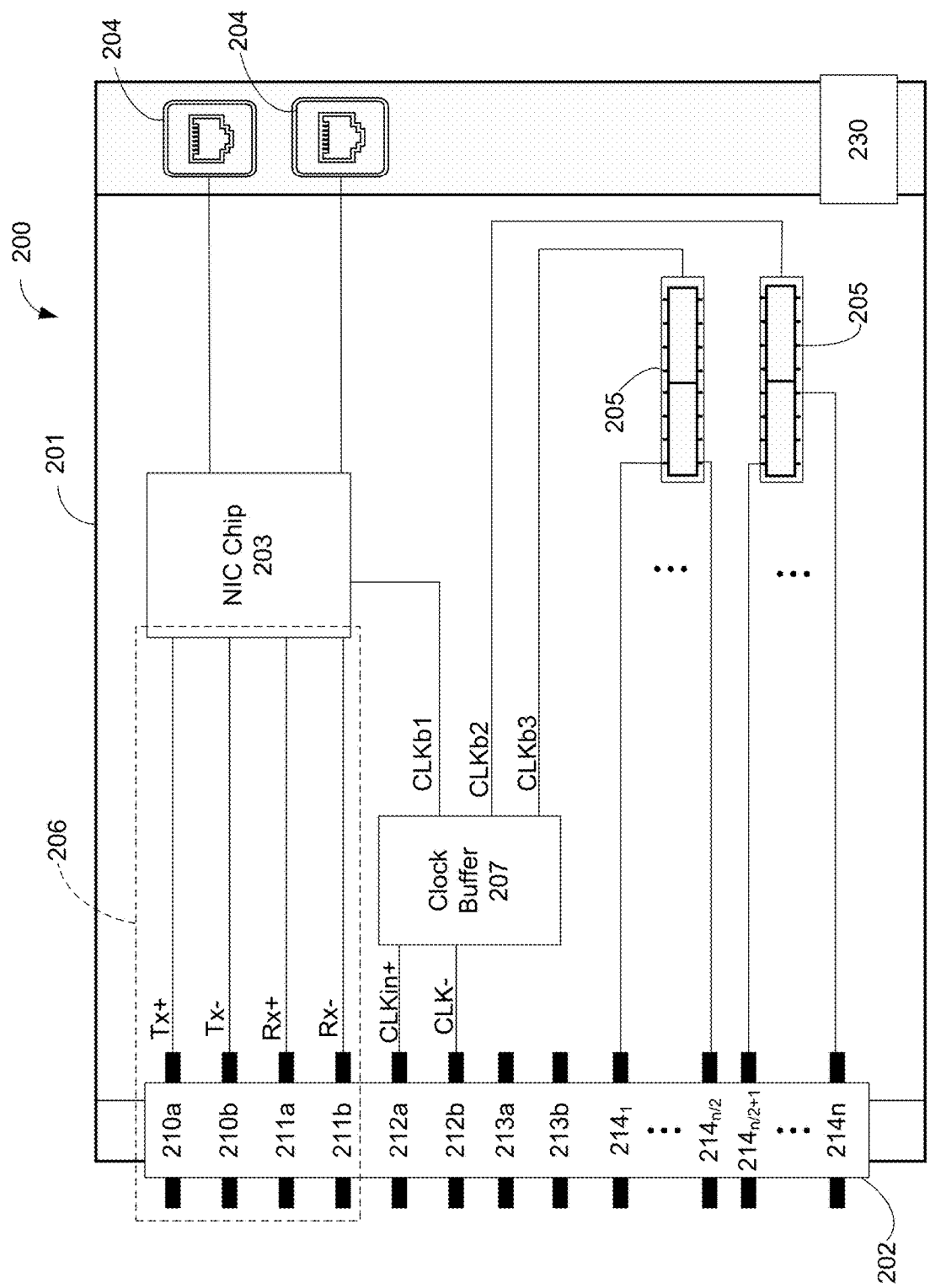
FIG. 2 is a schematic diagram of a removable OCP module with PCIe slots.

Now referring to FIG. 2, a schematic diagram of an example removable module 200 is presented. Removable module 200 is an example implementation of removable module 100. Removable module 200 includes some components which correspond to (e.g., are the same as or are examples of) components of the removable module 100, and these components are given similar reference numbers having the same last two digits, such as 104 and 204. Although removable module 200 is one example of the removable module 100, removable module 100 is not limited to removable module 200.

The removable module 200 comprises a printed circuit board 201 (which is one example configuration of PCB 101), an OCP edge connector 202 (which is one example configuration of connector 102), a NIC chip 203 (which is one example configuration of NIC chip 103), communication ports 204 (which is one example configuration of communication ports 104), and two PCIe slots 205 (which are example configurations of PCIe slot(s) 105).

In instances, OCP edge connector 202 includes a plurality of pins, where the plurality of pins may include at least pins 210a, 210b, 211a, 211b, 212a, 213b, and $214_1$-$214_n$. The pins 210a and 210b form a first differential pin pair 210a-b. The pins 211a and 211b form a second differential pin pair 211a-b. The pins 212a and 212b form a third differential pin pair 212a-b. and the pins 213a and 213-b form a fourth differential pin pair 213a-b. The pins $214_1$-$214_n$ may form various differential pin pairs, which are not labeled herein. In this context, n is used as an index representing any integer greater than two which corresponds to the total number of the pins 214. For example, in some instances there are sixty-four pins 214, in which case n=64.

Continuing to refer to FIG. 2, in some instances, first differential pin pair 210a-b may include a PCIe transmitter balanced pair (Tx+/Tx−). As used herein, a "PCIe transmitter balanced pair" is a pair of conductors, one with a positive signal (Tx+) and one with a negative signal (Tx−), configured for transmission using differential signaling, such as transmission of signal from NIC chip 103 to an HPM into which module 100 has been installed. In instances, second differential pin pair 211a-b may include a PCIe receiver balanced pair (Rx+/Rx−). As used in this disclosure, a "PCIe receiver balanced pair" is a pair of conductors, one with a positive signal (Rx+) and one with a negative signal (Rx−), configured for receiving differential signaling, such as receiving signals from the HPM to which module 100 is installed. In some examples, differential pin pairs 210a-b and 211a-b are connected via conductive paths through the circuit board to NIC chip 103, and these pin pairs and conductive paths together form a 1× (one lane) PCIe interface 206 for use by the NIC chip 103. It will be apparent to one of ordinary skill in the art the advantages of using differential signaling, such as reducing electromagnetic interference (EMI) on data transmitted and received. In some examples, differential pin pairs 210a-b and 211a-b are repurposed pin pairs, meaning that these pins are defined in the OCP standards for some purpose other than PCIe signaling. For example, in some implementations, differential pin pairs 210a-b and 211a-b correspond to pins which are defined by OCP for receiving clock signals.

More specifically, in some instances, connector 202 complies with the 4C+ connector form factor. In the OCP 3.0 specification for the 4C+ connector form factor, the pins numbered B14, B15, A14, A15, OCP_B11, OCP_B12, OCP_A11, and OCP_A12 are defined to receive clock signals named REFCLKn0, REFCLKp0, REFCLKn1, REFCLKp1, REFCLKn2, REFCLKp2, REFCLKn3, and REFCLKp3. However, in some examples of the connector 202, differential pin pairs 210a-b and 211a-b corresponds to four of the aforementioned pins, which are repurposed to form a PCIe lane instead of receiving clock signals. For example, differential pin pairs 210a-b and 211a-b may correspond to the pins numbered OCP_B11, OCP_B12, OCP_A11, and OCP_A12 in the OCP 3.0 specification, which would normally receive the clock signals REFCLKn2, REFCLKp2, REFCLKn3, and REFCLKp3 in a standard OCP NIC but which are repurposed to provide an 1× PCIe lane in some examples of the removable module 200.

Continuing to refer to FIG. 2, in an instance, clock buffer 207 is connected to third differential pin pair 213a-b which is configured to receive a differential clock signal input CLKin+/CLKin−. The differential clock signal input CLKin+/CLKin− is input to the clock buffer 207 as the clock signal input, and the clock buffer 207 outputs three clock signal outputs CLKb1, CLKb2, and CLKb3 to the NIC chip 103 and the PCIe slots 105. (Although FIG. 2 shows a single line for each of CLKb1, CLKb2, and CLKb3 to simplify the drawings, in practice clock signals CLKb1, CLKb2, and CLKb3 could each be differential clock signals which each have a pair of signals). In some examples, differential pin pair 213a-b correspond to two of the pins defined in an OCP specification for receiving clock signals. For example, in instances in which connector 102 complies with the 4C+ connector form factor, the third differential pin pair 213a-b comprises one of the above-described clock signal pins numbered B14, B15, A14, A15, OCP_B11, OCP_B12, OCP_A11, and OCP_A12 defined in the OCP NIC 3.0 specification. In some implementations, the third differential pin pair 213a-b comprises the pins numbered B14 and B15 defined in the OCP 3.0 specification, in which case the clock signal input CLKin+/CLKin− received by the third differential pin pair 213a-b may correspond to the clock signal REFCLKn0/REFCLKp0 defined by the OCP NIC 3.0 specification.

The differential clock signal input CLKin+/CLKin− is input to the clock buffer 207 as the clock signal input, and the clock buffer 207 outputs three clock signal outputs CLKb1, CLKb2, and CLKb3 to the NIC chip 103 and the PCIe slots 105. (Although FIG. 2 shows a single line for each of CLKb1, CLKb2, and CLKb3 to simplify the drawings, in practice clock signals CLKb1, CLKb2, and CLKb3 could each be differential clock signals which each have a pair of signals). In some examples, differential pin pair 213a-b correspond to two of the pins defined in an OCP specification for receiving clock signals. For example, in instances in which connector 102 complies with the 4C+ connector form factor, the third differential pin pair 213a-b comprises one of the above-described clock signal pins numbered B14, B15, A14, A15, OCP_B11, OCP_B12, OCP_A11, and OCP_A12 defined in the OCP NIC 3.0 specification. In some implementations, the third differential pin pair 213a-b comprises the pins numbered B14 and B15 defined in the OCP 3.0 specification, in which case the clock signal input CLKin+/CLKin− received by the third differential pin pair 213a-b may correspond to the clock signal REFCLKn0/REFCLKp0 defined by the OCP NIC 3.0 specification.

Continuing to refer to FIG. 2, the pins $214_1$-$214_n$ are configured to form PCIe lanes for the PCIe slots 205 (e.g., up to n/4 PCIe lanes). These pins $214_1$-$214_n$ may correspond to pins which are defined in an OCP specification to be used as PCIe pins. For example, OCP 4C+ and 4C connectors each have sixty-four (64) of their pins (i.e., thirty-two (32) differential pin pairs) which are defined for PCIe transmission or reception. That is, in an OCP 4C+ or 4C connector, there are sixteen PCIe transmission differential pairs and sixteen PCIe reception differential pin pairs, which can provide up to sixteen PCIe lanes. In some examples, the pins $214_1$-$214_n$ include pins corresponding to those sixty-four PCIe pins as defined for the 4C+ or 4C form factor. The PCIe lanes formed by pins $214_1$-$214_n$ may be divided among the PCIe slots 205. For example, in one instance in which two PCIe slots 205 are present, as illustrated in FIG. 2, half of the pins 214 (e.g., pins $214_1$-$214_{n/2}$) are connected to a first PCIe slot 205 and the other half (e.g., pins $214_{n/2+1}$-$214_n$) are connected to a second PCIe slot 205. In one example, each PCIe slot is given eight of the sixteen lanes, making each PCIe slot 205 an x8 slot with an x8 PCIe interface. In some examples, the OCP edge connector may include more PCIe pins than the 64 PCIe pins defined for the 4C+ or 4C connector—for example, in a LFF module, both a 4C+ and a 4C connector are present, and thus in an example which utilizes the LFF form factor, the connector 202 may have 128 PCIe pins capable of providing up to 32 PCIe lanes.

It is noted that in standard OCP NICs, the defined PCIe pins are connected to the NIC circuitry and configured to provide a PCIe interface used by the NIC circuitry for communication with the HPM. However, in some examples disclosed herein, these defined PCIe pins are instead coupled to the PCIe slot(s) 205 to provide the PCIe interfaces for the PCIe slot(s) 205, and the NIC chip 203 is instead provided a new PCIe 1× interface 206, not defined in the OCP specifications, which is formed by repurposing other pins, as already described above. In other examples, instead of repurposing pins to provide an additional PCIe interface for the NIC chip, the pins defined by OCP for PCIe may be shared among the NIC chip and the PCIe slots—for example, one or more of the PCIe slots 205 may receive fewer PCIe lanes and those lanes may instead be provided to the NIC chip 203.

Although removable module 200 is illustrated as having two PCIe slots 205, the principles described above may apply to other examples of removable module 100 in which more or fewer PCIe slots are present. For example, in further instances, some implementations of a removable module 100 (not illustrated) may include three or more PCIe slots, in which case the clock buffer could output additional clock signals to the additional PCIe slots and the defined PCIe lanes described above could be divided among the three or more PCIe slots. It will become apparent to a person with ordinary skill in the art that removable module 100 may be capable of including multiple PCIe slots 105 depending on the configuration of clock buffer 107 and/or OCP edge connectors 105. In other examples, a single PCIe slot is provided and that slot is given all sixteen of the defined PCIe lanes.

Still referring to FIG. 2, in instances, removable module 100 may include an ejecting mechanism 230. An "ejecting mechanism," as used herein, is a medium for ejecting removable module 100 from a primary board. In examples, ejecting mechanism 230 may include a latch, a button, a lever and the like. In an example, removable module 100 may include a lever on the side opposite to OCP edge connector 102, where upon pulling the lever removable module 100 is detached from a primary board. In instances, ejecting mechanism may be directly attached to OCP edge connector 102, where removable module 100 may be pressed against a primary board as to eject from the primary board. It will become apparent to one of ordinary skill in the art, upon reading this disclosure, that one of the benefits of removable module 100 is the ability to plug to and eject from a primary board without requiring the use of any specialized tools.

Figure 3:
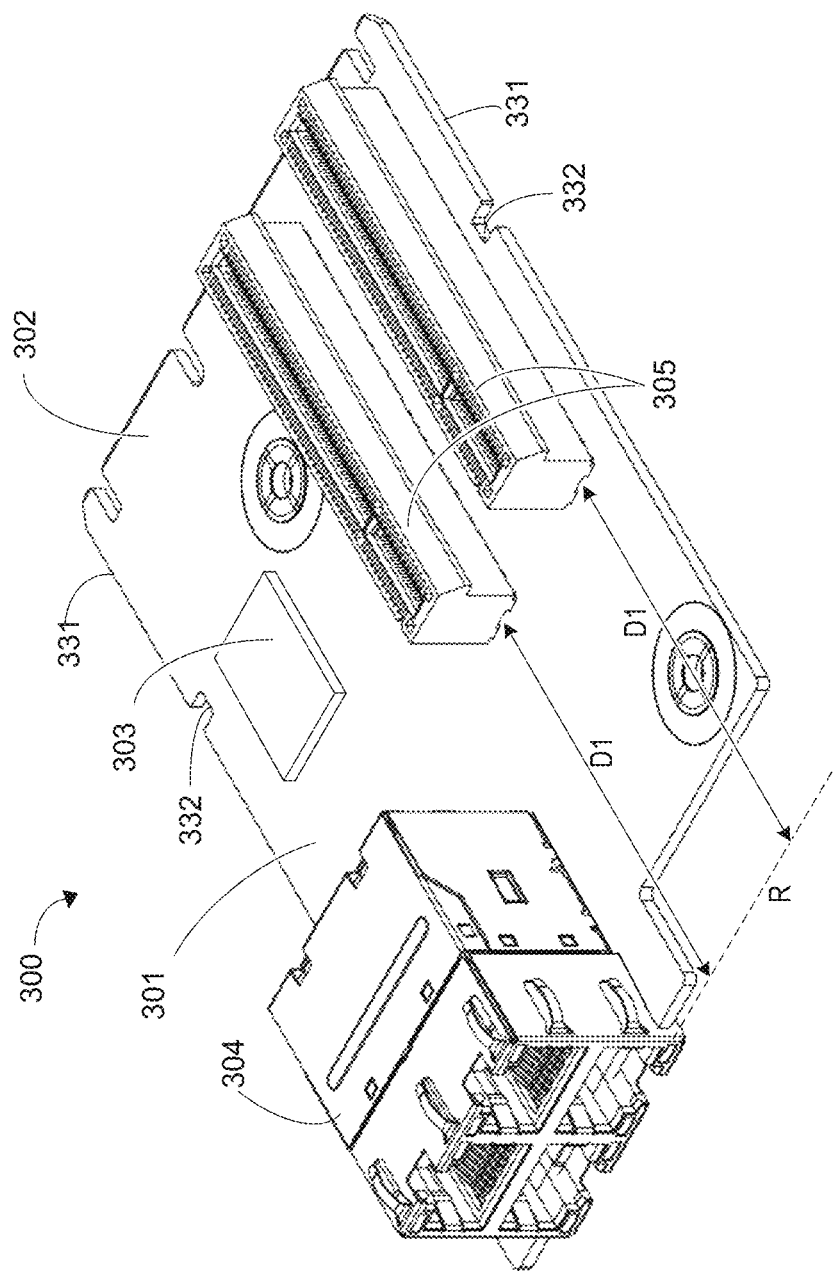
FIG. 3 is a perspective view of a removable OCP module with PCIe slots.

Now referring to FIG. 3, a removable module 300 will be described. Removable module 300 is an example instance of removable module 100. It should be understood that implementations of removable module 100 may include additional components, may have different arrangements of the illustrated components and may also include additional components not illustrated.

Removable module 300 comprises a PCB 301 which has an OCP SFF or TSFF form factor (both SFF and TSFF have the same PCB form factor). Thus, the PCB 301 comprises edges 331 which are configured as defined in the OCP specifications so as to be slidably receivable in rails of a computing system as the removable module is installed therein to guide the PCB 301 into an installed position and to physically support the module 300 when installed. In addition, the PCB comprises attachment features 332, in the form of notches, which receive complementary attachment features in the guide rails of the computing system to secure the removable module 300 in the installed position. The PCB 301 also comprises an OCP edge connector 302 at one end thereof, which in this example has a 4C+ form factor.

In this nonlimiting example, removable module 100 includes communication ports 104 mounted to PCB 101, with the communications ports 104 comprising four ethernet ports (RJ45 jacks). The communication ports 104 are communicably connected to NIC chip 303, which is in turn connected to OCP edge connector 102 via circuitry (not illustrated) in PCB 101. The connections between NIC chip 303 and edge connector 302 may be, for example, as illustrated in FIG. 3. In some additional examples, without limitations, communication port 104 may include fiber optic connection slots.

Continuing on this nonlimiting example, removable module 100 includes two PCIe slots 105 mounted to PCB 101 and communicably connected to OCP edge connector 102. It will be apparent to one of ordinary skill in the art that the above instance is presented as example only, and that in other examples removable module 100 may include and be consistent with any instances and/or examples provided in this disclosure. The PCIe slots 305 are positioned on the PCB 101 such that they will be a predetermined distance D1 from a rear panel of the computing system when the removable module 300 is installed therein. For example, in some implementations, the rear panel may be located where the dashed line labeled R is shown in FIG. 3. The predetermined distance D1 may correspond to the distance at which PCIe slots are commonly located from a rear panel in existing non-OCP systems, thus enabling existing PCIe expansion cards to use the PCIe slots 305 when installed. The PCIe slots 305 are connected to OCP edge connector 302, for example in the manner described above in relation to FIG. 2.

Figure 4:
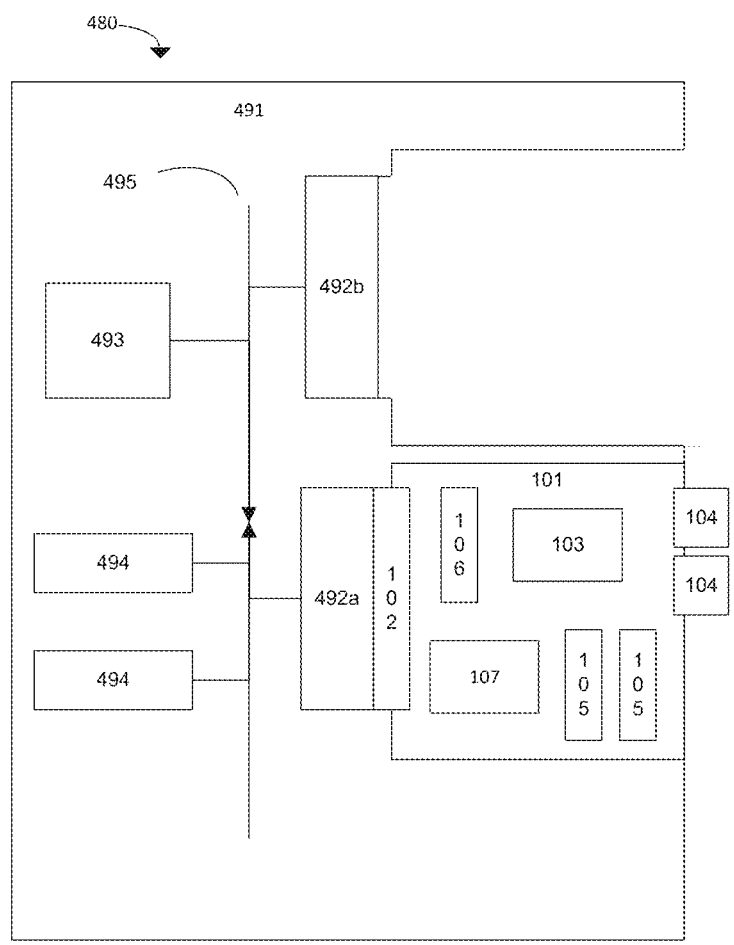
FIG. 4 is a block diagram illustrating an example of an OCP primary board coupled to a removable OCP module with PCIe slots.

Now referring to FIG. 4, a computing system 480 coupled to removable module 100 is presented. In instances, computing system 480 may include a primary system board 491. A "primary system board," as used in this disclosure, is a central circuit board comprising a central processing unit (CPU) and supporting circuitry, and configured to enable connection and integration among a plurality of components and devices. In examples, primary system board 491 may include an OCP primary board. In an instance, "OCP primary board," is a primary board configured for OCP form factor. In some instances, a primary board which complies with OCP form factors may be referred to as a Host Processor Module (HPM). In an example, unlike a non-OCP motherboard where most components are integrated into the board, in a OCP primary board those components may be external to the primary board. In instances, primary system board 491 may include one or more OCP board connectors 492a and 492b configured to receive OCP modules, such a removable module 100. An "OCP board connector," as used herein, is an integrated connector complying with an OCP specification and used for connecting OCP external components and devices. In examples, OCP board connector 492a may include an OCP NIC 3.0 connector, such as an OCP 4C+ or 4C connector. As used herein, a NIC 3.0 connector is a connector configured to receive a NIC 3.0 card. A NIC 3.0 card, as used herein, is an OCP-compliant network Interface Card that is configured to be connected to OCP primary boards. In some examples, the OCP connector 492b may include a connector to receive an OCP DC-SCM (not illustrated). In some examples, OCP board connectors 492a and b be located in receded OCP openings. A "receded OCP opening," as used herein, is a space within primary board 491 configured to receive removable module 100, or any other OCP module, where when installed the removable module 100 is aligned (e.g., coplanar) with the primary board 491, thus appearing to become a part of the primary board 491. In other examples, OCP board connector 492a and 492b may be located at the rear of primary board 491. A person with ordinary skill in the art will appreciate that the above-mentioned configurations are provided as nonlimiting examples only, and that computing system 480 may include many other configurations of primary system board 491 and/or OCP board connector 492 not described in this disclosure.

Continuing to refer to FIG. 4, in instances, computing system 480 may include a processor 493 mounted to primary system board 491. As used herein, a "processor" is a component configured for executing instructions, performing calculations and managing tasks. In instances, computing system 480 may include two or more processors 493 mounted to primary system board 491. In an example, without limitations, processor 493 may be a Central Processing Unit, (CPU).

Still referring to FIG. 4, in instances, computing system 480 includes at least a memory 494 mounted to primary system board 491. As used in this disclosure, a "memory" is a data storage component configured to store instructions for a computing component, such as processor 493. In examples, without limitations, memory 494 may be configured for temporary storage of data, such as a random-access memory (RAM), or permanent data storage, such as Solid-State drives (SSD).

In instances, continuing to refer to FIG. 4, board connector 492, processor 493 and/or memory 494 may communicate with each other via a bus 495. A "bus," as used herein, is a component configured for transmitting data. Bus 495 may include multiple types of bus structures, and combinations thereof, such as memory bus, memory controller, peripheral bus, local bus, and the like.

In instances, referring to FIG. 4, primary system board 491 includes a removable NIC-PCIe module. In instances, the removable NIC-PCIe module includes removable module 100. Removable module 100 is described in detail in reference to FIG. 1.

Figure 5:
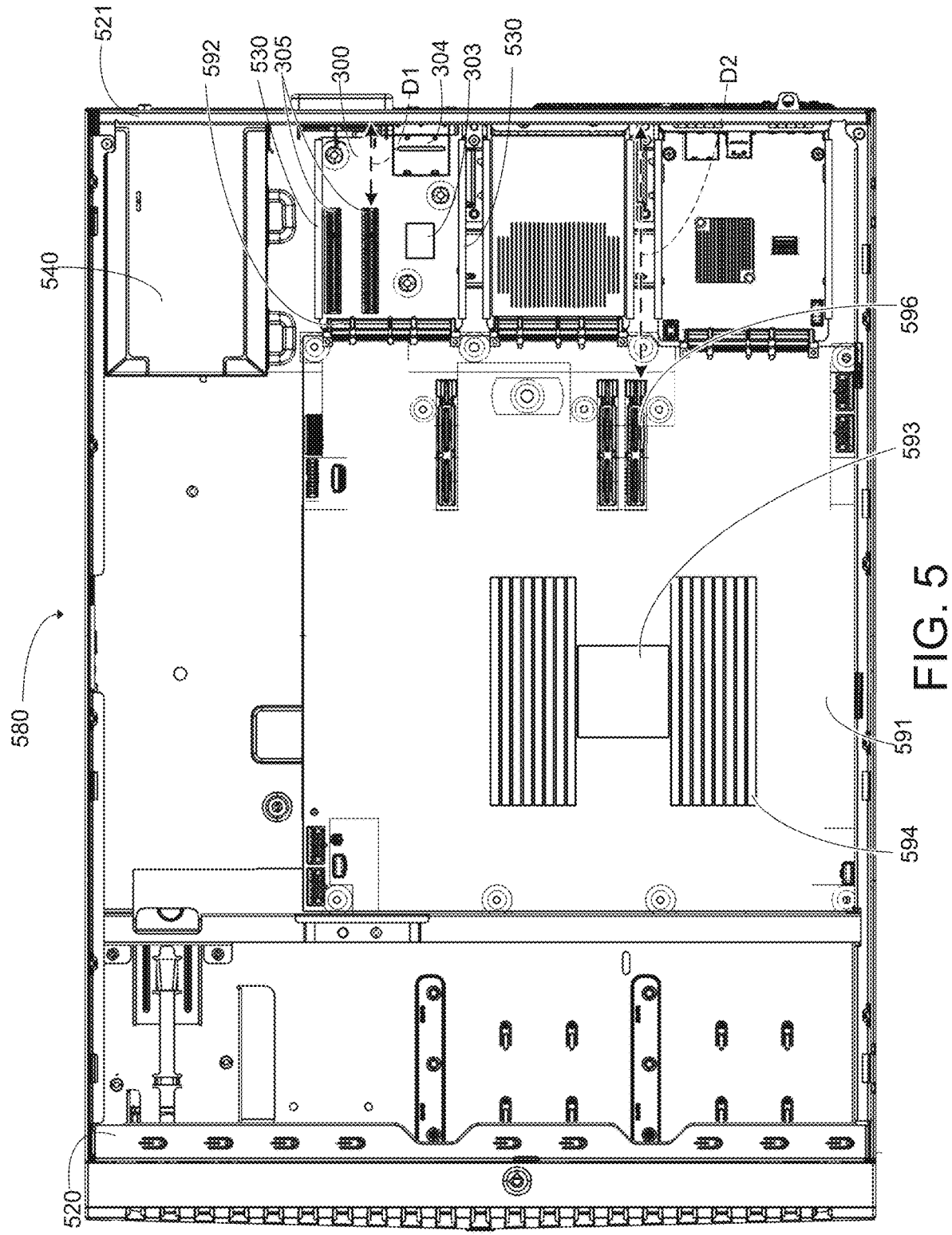
FIG. 5 is a side view of an illustrative example of a computing system comprising an OCP primary board together with a removable OCP module with PCIe slots.
Figure 6:
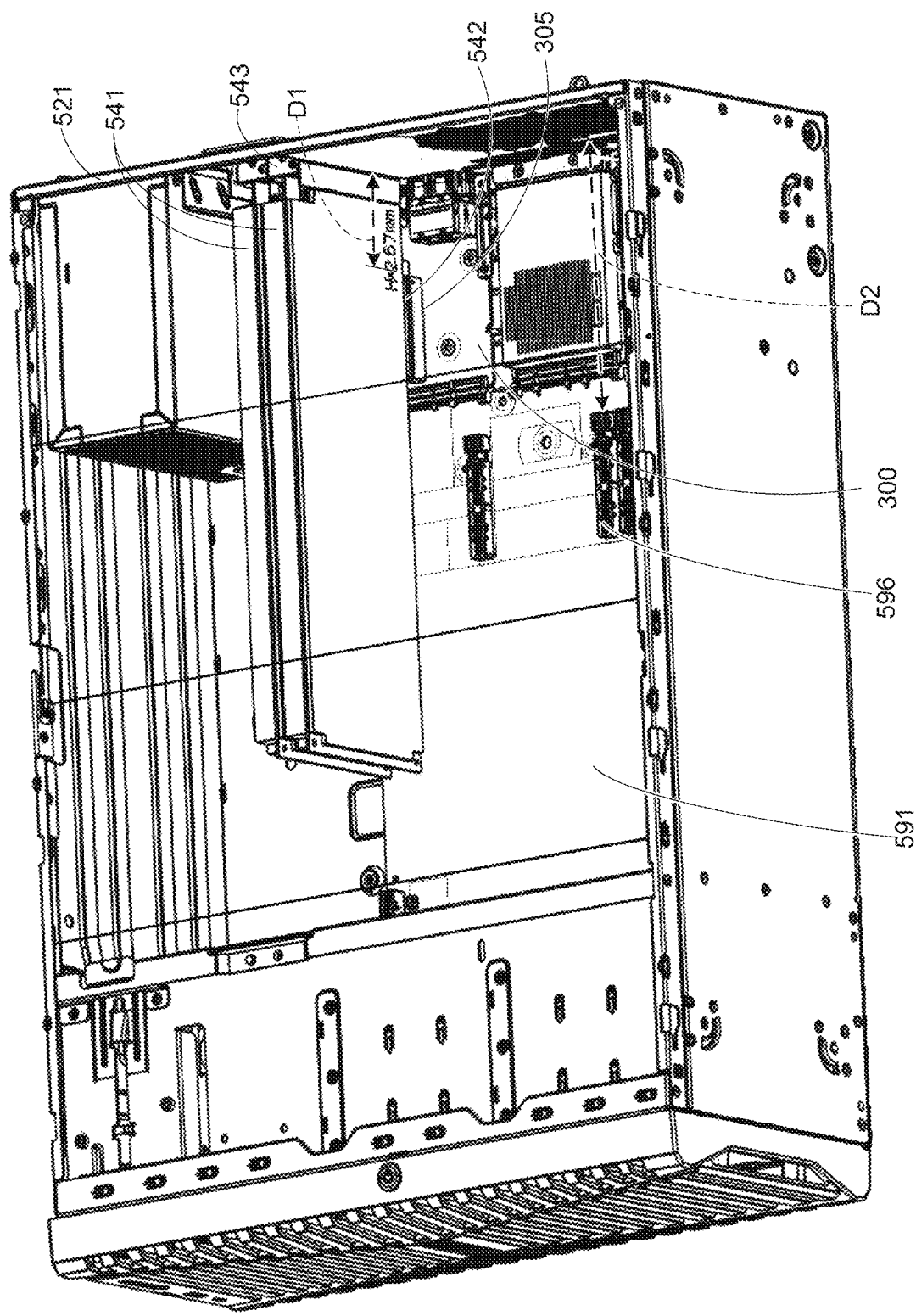
FIG. 6 is a perspective view of the computing system of FIG. 5 with PCIe expansion cards installed in the PCIe slots of the removable OCP module.

Now referring to FIGS. 5 and 6, an example computing system 580 is presented. The computing system 580 comprises a primary system board 591, a chassis, and a removable electronic module. In FIG. 5 and the description below, the removable electronic module 300 is shown and described as one example of the removable electronic module included in the system 580, but it should be understood that any of the removable modules described herein (including modules 100, 200, and 300) could be used in the system 580.

The computing system 580 is one example of the computing system 480 described above. As illustrated in FIGS. 5 and 6, system 580 has a vertical form factor, such as a tower server. 580 In some instances, a "vertical form factor" is a form factor of computing system designed to be oriented with its primary board perpendicular to the ground. It will be apparent to a person of ordinary skill in the art that the vertical form factor illustrated in FIGS. 5 and 6 are merely illustrative, and that computing system 580 could have a horizontal form factor; moreover, primary board 591 may be used in both horizontal form factor and vertical form factor systems.

The example computing system 580 comprises a primary board 591, which is a configuration example of the primary board 491. In some instances, the primary system board 591 comprises a processor 593 and memory 594, as well as other components (not illustrated). In some instances, the primary system board 591 also comprises one or more PCIe slots 596 mounted thereto. In some examples, computing system 580 may include a power supply unit 540. In some instances, computing system 580 may include one or more removable PCIe expansion cards 541, as shown in FIG. 6.

In instances, computing system 580 includes a chassis. A "chassis," as used herein, is an enclosure designed to house and support hardware components. The chassis includes a front panel 520, a rear panel 521, a top wall, a bottom wall and side panels (which one side is omitted in this example to show other components). In some examples, computing system 580 may include a power supply unit 540.

In instances, computing system 580 includes mounting rails 530, which are secured to the chassis either via direct attachment thereto or via attachment to the primary system board 591, which is in turn secured to the chassis. As used herein, "mounting rails" are brackets used for securing OCP-compliant modules, such as removable module 300, to the chassis of computing system 580. Specifically, the removable module 300 may be inserted through the rear panel 521 into a bay defined between a pair of the mounting rails 530, and during the insertion the edges 331 of PCB 301 are received within slots of the rails 530 which run parallel to the direction of insertion. As the insertion proceeds, the edges 331 slide along the mounting rails 530, with the mounting rails 530 guiding the module 300 into an installation position in which OCP edge connector 302 mates with OCP board connector 592. In the installed position, a latching feature (not illustrated), such as a flexible protrusion in the mounting rail 530, engages with the attachment feature 332 of the PCB 301 to secure the module 300 in the installed position.

In the illustrated example, without limitations, removable module 300 may be located near the rear edge of primary board 591. In some examples, the OCP board connector 592 is straddle-mounted to the rear edge of the primary board 591 and the top of PCB 301 of the removable module 300 may be approximately coplanar with the top of primary board 591. In some examples, the removable module 300 is positioned fully rearward of the primary system board 591, as shown in FIG. 5, meaning that no portion of the primary system board 591 extends rearward beyond the leading edge of the removable module 300. In other examples, the rear edge of the primary system board 591 may follow a more meandering path and portions of the primary system board 591 may extend rearward beyond the front edge of module 300; in particular, in some instances the rear edge of the primary system board 591 may define a slot or indentation into which the removable module 300 is inserted such that the primary system board 591 is adjacent to three sides of the module 300 (e.g., a front and two lateral sides). In all of these configurations, communication ports 304 are positioned adjacent to, or become part of, the rear panel 521, and thus may directly be accessible from outside the chassis through the rear panel 521.

Moreover, in some examples, in the installed state, PCIe slots 305 are located the distance D1 from the rear panel 521 and are positioned to be able to mate with a PCIe edge connector 542 of a PCIe expansion card 541 which is attached to the rear panel 521 (e.g., via attachment features 543), as shown in FIG. 6. In contrast, the PCIe slots 596 of the primary system board 591 are located a distance D2 from the rear panel 521, which may be too far from the rear panel 521 to allow for mating with edge connector 542 of removable module 541 while the removable module 541 is attached to rear panel 521. Accordingly, the PCIe slots 305 on the removable module 300 can allow for the use of PCIe expansion cards which might otherwise not be useable in the system 580. Moreover, the PCIe slots 305 increase the total number of available PCIe slots in the system 580.

In instances, a method is presented. The method includes mating OCP edge connector 102 of removable module 100 to OCP board connector 402 of primary system board 401. The method further includes communicably coupling communication port 104 of removable module 100 to primary system board 401 via NIC chip 103 of removable module 100, OCP edge connector 102 and OCP board connector 402. In instances, the method further includes communicably coupling one or more PCIe slots 105 of removable module 100 to primary board 401 via OCP edge connector 102 and OCP board connector 402.

In instances, the method may include transmitting a clock signal from primary board 401 to removable module 100 via OCP board connector 402. In instances, method may further include receiving, by clock buffer 107, the clock signal. In some instances, the method may further include generating, by clock buffer 107, a plurality of clock signal outputs based on the clock signal and providing the clock signal outputs to NIC chip 103 and one or more PCIe slots 105.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are nonlimiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A removable module for a computing system, wherein the removable module comprises:
   a printed circuit board (PCB) having an open compute project (OCP) network interface controller (NIC) form factor;
   an OCP edge connector comprising a plurality of pins on an edge of the PCB, wherein the OCP edge connector is configured to mate with an OCP board connector of a primary system board of the computing system in an installed state of the removable module in the computing system;
   a NIC chip mounted to the PCB and communicably connected to the OCP edge connector;
   at least one communication port mounted to the PCB and communicably connected to the NIC chip; and
   a first PCIe slot mounted on the PCB and communicably connected to the OCP edge connector;
   wherein the NIC chip and the first PCIe slot are configured to be communicably connected to the primary system board via the OCP edge connector and OCP board connector in the installed state of the removable module.

2. The removable module of claim 1, further comprising a first PCIe interface comprising first and second differential pin pairs of the plurality of pins, wherein the NIC chip is communicably connected to the PCIe interface.

3. The removable module of claim 2, wherein the OCP edge connector has the form factor of an OCP connector defined in an OCP specification, and the first and second differential pin pairs correspond to pins defined in the OCP specification to receive clock signals, which are repurposed to form the first PCIe interface.

4. The removable module of claim 2, further comprising a clock buffer mounted to the PCB and configured to receive a clock signal input from the OCP edge connector and output one or more clock signal outputs to the NIC chip and/or to the first PCIe slot.

5. The removable module of claim 4, wherein the clock buffer is communicably connected to a third differential pin pair of the plurality of pins to receive the clock signal input.

6. The removable module of claim 4, wherein the NIC chip is communicably connected to the clock buffer to receive a first clock signal of the clock signal outputs.

7. The removable module of claim 5, wherein the first PCIe slot is communicably connected to the clock buffer to receive a second clock signal of the clock signal outputs, and wherein the removable module further comprises a second PCIe slot mounted to the PCB and communicably connected to the clock buffer to receive a third clock signal of the clock signal outputs.

8. The removable module of claim 2, wherein the first differential pin pair comprises a PCIe transmitter balanced pair (Tx+/Tx−).

9. The removable module of claim 2, wherein the second differential pin pair comprises a PCIe receiver balanced pair (Rx+/Rx−).

10. The system of claim 2, further comprising a second PCIe interface comprising a subset of the plurality of pins, wherein the first PCIe slot is communicably connected to the second PCIe interface.

11. The removable module of claim 1, wherein the OCP edge connector comprises a first edge connector portion configured to connect to a first OCP board connector and a second edge connector portion configured to connect to a second OCP board connector.

12. The removable module of claim 11, further comprising a second PCIe slot mounted to the PCB and communicably connected to the OCP edge connector.

13. A computing system, comprising:
  a primary system board comprising one or more OCP board connectors configured to respectively receive OCP modules;
  a processor mounted to the primary system board;
  at least a memory mounted to the primary system board; and
  a removable NIC-PCIe module comprising:
    a PCB having an OCP NIC form factor;
    an OCP edge connector comprising a plurality of pins on an edge of the PCB, wherein the OCP edge connector is configured to mate with at least one OCP board connector of the primary system board in an installed state of the removable module in the computing system;
    a NIC chip mounted to the PCB and communicably connected to the OCP edge connector;
    at least one communication port mounted to the PCB and communicably connected to the NIC chip; and
    at least one PCIe slot mounted on the PCB and communicably connected to the OCP edge connector;
    wherein the NIC chip and the at least one PCIe slot are configured to be communicably connected to the primary system board via the OCP edge connector and OCP board connector in the installed state of the removable module.

14. The computing system of claim 13, wherein the removable NIC-PCIe module further comprises a clock buffer coupled to the plurality connector pins.

15. The computing system of claim 14, wherein the NIC chip is coupled to the clock buffer.

16. The computing system of claim 14, wherein the at least one PCIe slot is coupled to the clock buffer.

17. The computing system of claim 13, wherein the removable NIC-PCIe module further comprises a PCIe interface.

18. The computing system of claim 17, wherein the at least one PCIe slot is coupled to the PCIe interface.

19. A method comprising:
  mating an OCP edge connector of a removable module to an OCP connector of a primary system board;
  communicably coupling a communication port of the removable module to the primary system board via a NIC chip of the removable module, the OCP edge connector, and the OCP connector; and
  communicably coupling one or more PCIe slots of the removable module to the primary system board via the OCP edge connector and the OCP connector.

20. The method of claim 19, further comprising:
  transmitting a clock signal from the primary system board to the removable module via the OCP connector;
  receiving, by a clock buffer of the removable module, the clock signal;
  generating, by the clock buffer, a plurality of clock signal outputs based on the clock signal and providing the clock signal outputs to the NIC chip and to the one or more PCIe slots.

* * * * *